UNITED STATES PATENT OFFICE.

ARTHUR EICHENGRÜN, OF DUSSELDORF, GERMANY, ASSIGNOR TO FARBENFABRIKEN VORM. FRIEDR. BAYER & CO., OF ELBERFELD, GERMANY, A CORPORATION OF GERMANY.

COMPOSITION FOR GENERATING FORMALDEHYDE.

No. 880,204. Specification of Letters Patent. Patented Feb. 25, 1908.

Application filed June 2, 1906. Serial No. 319,963. (Specimens.)

*To all whom it may concern:*

Be it known that I, ARTHUR EICHENGRÜN, doctor of philosophy, chemist, a citizen of the German Empire, residing at Dusseldorf, Germany, Kingdom of Prussia, have invented new and useful Improvements in Composition for Generating Formaldehyde, of which the following is a specification.

My invention relates to new preparations generating gaseous formaldehyde by treating them with water. The new preparations are mixtures containing salts of those peracids which are derived from metal peroxids, having an alkaline reaction, and polymeric formaldehyde, e. g. para-formaldehyde, trioxymethylene.

For my purpose I can use salts of perboric acids, such as the perborate of sodium, $Na_2B_4O_8.10H_2O$, salts of percarbonic acid, for example the percarbonate of sodium, $Na_2CO_4$, salts of pertitanic acid, such as the pertitanate of potassium, $K_4TiO_9.10H_2O$, salts of pervanadic acid, for example the pervanadiate of sodium, $NaVO_4$, salts of peruranic acid, such as the peruranate of potassium, $K_2UO_5$, salts of perzirconic acid, for example the perzirconate of sodium, $Na_4Zr_2O_{11}.9H_2O$, salts of permolybdic acid, such as the permolybdate of potassium, $KMoO_4$, etc. The salts are mixed preferably with para-formaldehyde, and subsequently water is added to the mixture. The mixtures of the salts with the polymeric formaldehyde may be pressed into pastils or larger pieces, and in this form are ready for use.

The reaction, which takes place on addition of water, results very probably in the depolymerization of paraformaldehyde, and the consequent generation of formaldehyde at such a rise of temperature that the added water is converted into steam and oxygen is liberated from the peracid salts. This reaction is probably caused by the catalytic action of para-formaldehyde on the peracid salts, decomposing the same with the formation of alkali hydroxid, and the latter depolymerizing para-formaldehyde.

The reaction can be assisted by the addition of fixed alkaline compounds, such as sodium carbonate, calcium carbonate, sodium hydroxid, or the like. For carrying out this manner of proceeding, e. g. equal parts of sodium hydroxid, sodium perborate and para-formaldehyde are mixed, and to the resulting mixture double the quantity of water is added. A lively evolution of gas takes place and streams of formaldehyde and steam are given off which can be made use of for disinfecting closed rooms. The quantity of water used can be increased. The other of the above-mentioned salts of peracids react in an analogous manner. Also mixtures of the above-mentioned salts of peracids, for example: 2 parts of sodium hydroxid, 1 part of sodium perborate, and 1 part of pertitanate of potassium and 2 parts of paraformaldehyde may be employed in the above process. Instead of 1 part of sodium hydroxid I can also employ 1 part of potassium hydroxid or $1\frac{1}{2}$ part of sodium carbonate or potassium carbonate. Or a stream of formaldehyde gas, mixed with steam, can also be generated if one part of paraform and one part of sodium perborate are mixed, and to the resulting mixture double the quantity of water is added. Instead of employing 1 part of sodium perborate I can also take in this formula $\frac{1}{2}$ part of sodium perborate and $\frac{1}{2}$ part of pertitanate of potassium.

Having now described my invention and in what manner the same is to be performed, what I claim as new and desire to secure by Letters Patent, is:—

1. A composition of matter, generating gaseous formaldehyde and water vapor when treated with water, and consisting of a mixture of polymeric formaldehyde with salts of those peracids which are derived from metallic peroxids, having an alkaline reaction, substantially as hereinbefore described.

2. A composition of matter generating gaseous formaldehyde and water vapor when treated with water, and consisting of a mixture of para-formaldehyde with salts of those peracids which are derived from metallic peroxids, having an alkaline reaction, substantially as hereinbefore described.

3. A composition of matter generating gaseous formaldehyde and water vapor when treated with water, and consisting of a mixture of para-formaldehyde with perborate of sodium, substantially as hereinbefore described.

4. A composition of matter generating gaseous formaldehyde and water vapor when treated with water, and consisting of a mixture of polymeric formaldehyde with salts of those peracids which are derived from metallic peroxids, having an alkaline reaction, and fixed alkaline compounds, substantially as hereinbefore described.

5. A composition of matter generating gaseous formaldehyde and water vapor when treated with water, and consisting of a mixture of para-formaldehyde with salts of those peracids which are derived from metallic peroxids, having an alkaline reaction, and fixed alkaline compounds, substantially as hereinbefore described.

6. A composition of matter generating gaseous formaldehyde and water vapor when treated with water, and consisting of a mixture of para-formaldehyde with perborate of sodium and fixed alkaline compounds, substantially as hereinbefore described.

In testimony whereof I have hereunto set my hand in the presence of two subscribing witnesses.

ARTHUR EICHENGRÜN.

Witnesses:
OTTO KÖNIG,
J. A. RITTERSHAUS.